F. D. MALTMAN.
FRUIT DRIER.
APPLICATION FILED JULY 17, 1919.

1,331,658.

Patented Feb. 24, 1920.

INVENTOR
F. D. MALTMAN

ATT'Y.

United States Patent Office.

FRANCIS D. MALTMAN, OF SEBASTOPOL, CALIFORNIA.

FRUIT-DRIER.

1,331,658.

Specification of Letters Patent. Patented Feb. 24, 1920.

Application filed July 17, 1919. Serial No. 311,492.

*To all whom it may concern:*

Be it known that I, FRANCIS D. MALTMAN, a citizen of the United States, residing at Sebastopol, in the county of Sonoma, and State of California, have invented new and useful Improvements in Fruit-Driers, of which the following is a specification.

When fruit in a drier is dried by means of the ordinary natural draft, caused by the smaller density of heated air, the air ascends comparatively slowly, the fruit is dried uniformly and a distributor is not needed. However, this is only satisfactory when the trays in the drier are only two or three deep. In that case, the heated air can pass with comparative freedom through the trays. But if it be attempted to so dry fruit in trays of a greater number of layers, as ten or twelve, the air is so obstructed in its passage through such a large number of trays, that its upper flow is slow, and its heat is all abstracted therefrom by the time it reaches the upper trays, so that the upper trays remain cold and clammy while the lower trays are unduly heated.

If it be attempted to avoid this result by providing forced suction, as by a suction pump, so as to expedite the flow of air through the trays, it results that the air flows more or less directly upward to the point of suction, and the trays which are not in line with the flow of the heated air remain cold and undried.

Figure 1:
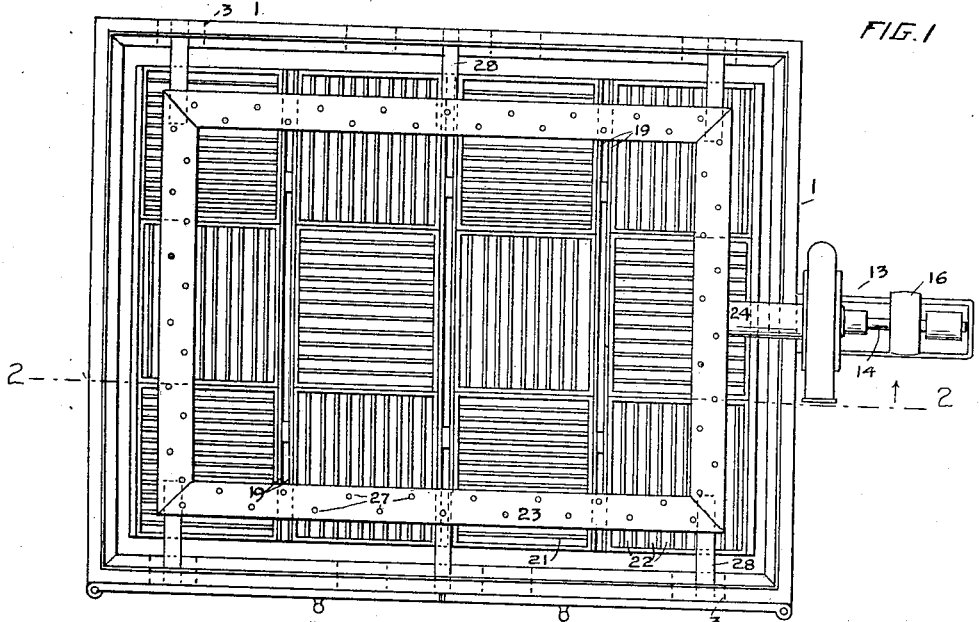
Figure 2:
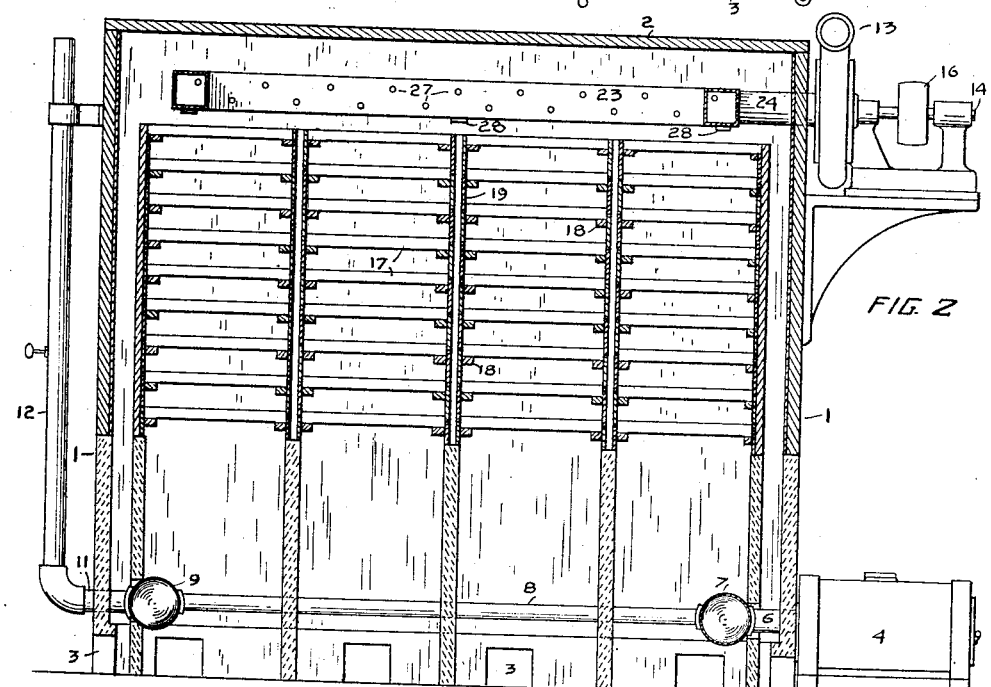
Figure 3:
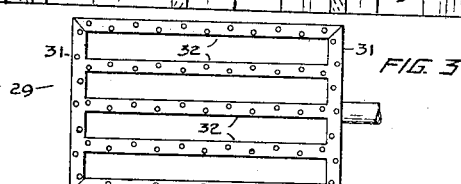

In the accompanying drawing, Figure 1 is a plan view, the top being removed, of my improved drier; Fig. 2 is a vertical section thereof on the line 2—2 of Fig. 1; Fig. 3 is a plan view of a modified form of the distributer.

Referring to the drawing, 1 indicates the walls and 2 the roof of a drying chamber. Said walls have openings 3 at the bottom to admit atmospheric air into the chamber. 4 indicates a furnace. The products of combustion from said furnace communicate by a pipe 6 with a wide tube or drum 7, closely adjacent to one side of the drier, the ends of which drum communicate by tubes 8 with the ends of a similar drum 9 closely adjacent to the opposite side of the drier, from which drum 9 the said products are conducted by a tube 11 to a smoke-stack 12.

The air entering the drier through the openings 3 is heated by contact with said drums 7, 8, and 9 and ascends through the drier. This ascent is facilitated, as hereinafter explained, by a suction pump 13, of which the shaft 14 carries a pulley 16 driven from any suitable source, preferably electric, of power. In the drier are arranged trays 17 for supporting the fruit to be dried, said trays being supported upon horizontally extending bars 18. Said trays are spaced apart from each other by partitions 19.

The bottoms of the trays 17 for supporting the fruit are formed with slats 21, spaced from each other, as shown at 22, to permit the air to flow upwardly therebetween and to come into contact with the fruit.

Heretofore, in this class of driers, the tendency of the ascending air has been to flow upwardly to a single point, namely, the entrance to the air flue leading to the outside of the drier and communicating with a suction pump or with a chimney. In consequence, it has resulted that only the fruit which was in a direct line between the entrance of the air to the drier and the exit therefrom has been thoroughly dried, and outlying portions of the fruit remained undried, because insufficiently exposed to contact with the heated air.

In my invention, I provide in the upper portion of the drier a conduit or distributer 23 at a uniform distance from its wall, and therefore, rectangular in form, following the contour of the drier. This conduit is connected with a conduit 24 leading to a suction pump 13. Said conduit is formed in the sides and top with a large number of comparatively small holes 27, through which the air can enter said conduit. This apertured conduit has the effect of causing the air entering the drier to pass through the parts of the trays adjacent to the walls of said drier, as well as those parts in the center of the drier. The air passes through the parts adjacent to the walls because there is a direct upward draft between the air heated by contact with the drums 7, 9 and the pipes 8 and the distributer tube 23.

The heated air also passes through the central portion of the trays because there is a general upward draft at the center produced by the suction into said distributer 23 through all the holes in its inner sides. Thus the fruit in all parts of the trays is sufficiently dried.

The distributer is supported by means of rods 28, connected each at one end with a wall of the drier and at the other end with the distributer.

In Fig. 3 is shown a distributer 29 of modified form in which end members 31 are connected by hollow parallel longitudinal members 32 apertured similarly to the distributer 23.

I claim:—

1. In a fruit drier, the combination of a chamber, means therein for supporting vertical series of trays having apertured bottoms for supporting fruit thereon, a furnace, heating pipes arranged adjacent to the walls of the chamber and in the lower portion thereof, and into which the products of combustion lead from said furnace, a stack into which the products of combustion lead from said heating pipes, said walls having openings in the lower portions thereof to admit air into said chamber to be heated by said pipes, a distributer in the upper portion of said chamber above the trays so supported, and comprising a conduit located adjacent to walls of said chamber and apertured through its top and sides, and a suction pump with which said conduit communicates.

2. In a fruit drier, the combination of a chamber, means therein for supporting vertical series of trays having apertured bottoms for supporting fruit thereon, a furnace, heating pipes arranged adjacent to the walls of the chamber and in a lower portion thereof and into which the products of combustion lead from said furnace, a stack into which the products of combustion lead from said heating pipes, said walls having openings in the lower portions thereof to admit air into said chamber to be heated by said pipes, a distributer in the upper portion of said chamber above the trays so supported, and comprising a conduit located adjacent to walls of said chamber and having branches extending through the upper part of the middle portion of said chamber, and apertured through its tops and sides, and a suction pump with which said conduit communicates.

FRANCIS D. MALTMAN.